(12) United States Patent
DiCosimo et al.

(10) Patent No.: US 7,790,834 B2
(45) Date of Patent: Sep. 7, 2010

(54) COPOLYMERS COMPRISING TRIMETHYLENE CARBONATE AND POLY(TRIMETHYLENE ETHER) GLYCOLS

(75) Inventors: Robert DiCosimo, Chadds Ford, PA (US); Neville Everton Drysdale, Newark, DE (US); Hari Babu Sunkara, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/277,616

(22) Filed: Nov. 25, 2008

(65) Prior Publication Data

US 2009/0143555 A1 Jun. 4, 2009

Related U.S. Application Data

(60) Provisional application No. 60/991,339, filed on Nov. 30, 2007.

(51) Int. Cl.
*C08G 64/00* (2006.01)
*C08G 63/02* (2006.01)

(52) U.S. Cl. ................... 528/198; 424/59; 424/65; 424/70.1; 424/222; 526/314; 528/405; 528/425; 568/595

(58) Field of Classification Search .......... 424/59, 424/65, 70.1, 222; 526/314; 528/405, 425; 568/595

See application file for complete search history.

(56) References Cited

U.S. PATENT DOCUMENTS

| 6,451,949 B2 * | 9/2002 | Boon et al. ............. 526/314 |
| 6,593,444 B2 | 7/2003 | Forschner et al. |
| 7,169,588 B2 | 1/2007 | Burch et al. |
| 2002/0052461 A1 | 5/2002 | Forschner et al. |
| 2009/0143555 A1 * | 6/2009 | DiCosimo et al. ........ 526/314 |
| 2009/0143624 A1 * | 6/2009 | DiCosimo et al. ........ 568/595 |

OTHER PUBLICATIONS

Hajime Yasuda, Mohad-Serah Aludin, Naoyuki Kitamura, Mari Tanabe, and Hiroyuki Sirahama, Department of Applied Chemistry, Faculty of Engineering, Hiroshima University, Higashi-Hiroshima, 739-8527, Japan Macromolecules, 1999, 32 (19), pp. 6047-6057.*
Abstract: Homopolymerization of 1,8Dioxan-2-one to High Molecular Weight Poly(Trimethylene Carbonate) Authors: Ann-Christine Albertson et al., Journal of Macromolecular Science, Part A, vol. 29, Issue 1 Jan. 1992, pp. 43-54.*
International Search Report, PCT International Application PCT/US2008/084677, Mar. 6, 2009.
T. Ariga, et al., Block Copolymerization of Cyclic Carbonate and Oxetanes in One-Shot Feeding, Macromolecules, vol. 26, 1993, pp. 7106-7107.
Hyun et al., Ring-Opening Polymerization of Trimethylene Carbonate by Poly (Ethylene Gycol) in the Presence of HCl-ET2O as a Monomer Activator, J. Polym. Sci. Part A: Polym. Chem., 2006, vol. 44:4235-4241.

* cited by examiner

*Primary Examiner*—Terressa M Boykin
(74) *Attorney, Agent, or Firm*—Gail D. Tanzer

(57) ABSTRACT

The present invention relates to novel copolymers comprising unsubstituted or R-substituted trimethylene carbonate and poly(trimethylene ether)glycol. The copolymers find use in areas including personal care, coatings and lubricants.

19 Claims, No Drawings

COPOLYMERS COMPRISING TRIMETHYLENE CARBONATE AND POLY(TRIMETHYLENE ETHER) GLYCOLS

This application claims the benefit of U.S. Provisional Application No. 60/991,339, filed Nov. 30, 2007, herein incorporated by reference.

FIELD OF THE INVENTION

The present invention relates to novel copolymers comprising an unsubstituted or R-substituted trimethylene carbonate (TMC) and poly(trimethylene ether)glycol. The copolymers find use in areas including personal care, coatings, lubricants and polyurethane elastomers.

BACKGROUND

U.S. Pat. No. 6,593,444 discloses the use of poly(trimethylene carbonate) (PTMC) diol in thermoplastic polyurethane elastomers (TPUs) in which elastomeric properties were obtained. Monomeric glycols were used, including polyhydric alcohols such as, for example, 1,3-propanediol and trimethylolpropane.

Hyun et al, J. Polym. Sci. Part A: Polym. Chem. 44, 2006, 4235 disclose the polymerization of TMC in the presence of polyethylene glycol to give biocompatible systems.

SUMMARY OF THE INVENTION

One aspect of the present invention is a composition, comprising a copolymer comprising unsubstituted or substituted polytrimethylene carbonate-based segments and poly(trimethylene ether)glycol-based segments, the copolymer having the structure:

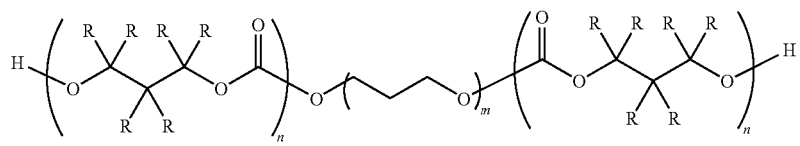

wherein each R substituent is independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and wherein each R substituent can optionally form a cyclic structural group with adjacent R substituents where typically such cyclic structural groups are $C_3$-$C_8$ cyclic structural groups, e.g., cyclopropane, cyclobutane, cyclopentane, cyclohexane, cycloheptane, and cyclooctane.

m is the number of trimethylene ether units and is an integer of 5 to 100; and n is the number of trimethylene carbonate-units, and each n is an integer independently selected from integers of 1 to 50 inclusive.

Another aspect of the present invention is a process for making a copolymer comprising unsubstituted or substituted polytrimethylene carbonate-based segments and poly(trimethylene ether)glycol-based segments, the process comprising:

contacting a poly(trimethylene ether)glycol with trimethylene carbonate or an R-substituted trimethylene carbonate in the presence of an acid to form a polymer having the structure:

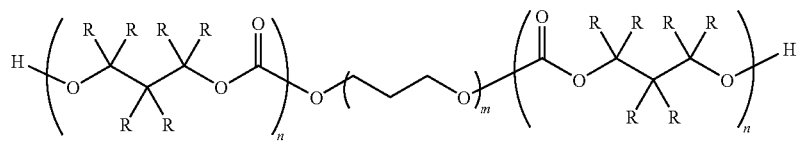

wherein m is the number of poly(trimethylene ether)glycol-based segments and is an integer of 5 to 100; and n is the number of trimethylene carbonate-based segments, and each n is independently an integer of 1 to 50; and wherein each R substituent is independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and wherein each R substituent can optionally form a cyclic structural group with adjacent R substituents.

DETAILED DESCRIPTION

The present invention relates to novel copolymer compositions based on poly(trimethylene ether)glycol and unsubstituted or substituted trimethylene carbonate. Trimethylene carbonate can also be derived from poly(trimethylene ether) glycol. A representation of the general reaction is shown below:

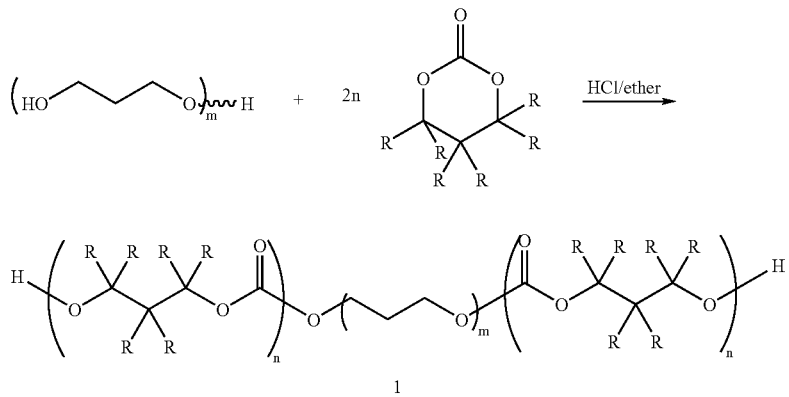

As shown, a poly(trimethylene ether)glycol (also known as PO3G, available as Cerenol™ polyols from E.I. du Pont de Nemours and Company, Wilmington, Del.) and trimethylene carbonate (1,3-dioxan-2-one) are combined in the presence of an acid such as, for example, hydrochloric acid (HCl), sulfuric acid ($H_2SO_4$) phosphoric acid ($H_3PO_4$)), or organic acids such as trifluoroacetic acid, trifluoromethylacetic acid, and trifluoromethanesulfonic acid, 1,1,2,2-tetrafluoroethanesulfonic acid (TFESA) and a solvent that does not substantially react with the reactants that are used to form the resulting composition. Examples of suitable such solvents include diethyl ether and methylene chloride. Generally, the reaction will be quantitative (about 95 to 100 percent conversion to ABA block copolymer (a polymer composition consisting of polycarbonate-polytrimethylene-polycarbonate segments in this order)), but can be about 70 to 80 percent conversion when the ratio of TMC to poly(trimethylene ether)glycol is high, generally greater than a mole ratio of 100:1::TMC:poly (trimethylene ether)glycol. This composition is of the structure 1, an ABA block copolymer of poly(carbonate-ether-carbonate). In structure 1 above, m is an integer of 5 to 100, particularly 5 to 10, inclusive. In structure 1 above, n is an integer, each n independently selected from 1 to 50, particularly 1 to 30, more particularly 1 to 25, and more particularly an integer of 1 to 15.

In some embodiments, the ABA block copolymer is used as a soft segment in a thermoplastic elastomer.

In the structure above, each R substituent is independently selected from the group consisting of H, $C_1$-$C_{20}$ alkyl, particularly $C_1$-$C_6$ alkyl, $C_3$-$C_{20}$ cyclic alkyl, $C_3$-$C_6$ cyclic alkyl, $C_5$-$C_{25}$ aryl, particularly $C_5$-$C_{11}$ aryl, $C_6$-$C_{20}$ alkaryl, particularly $C_6$-$C_{11}$ alkaryl, and $C_6$-$C_{20}$ arylalkyl, particularly $C_6$-$C_{11}$ arylalkyl, and each R substituent can optionally form a cyclic structural group with adjacent R substituents. Typically such cyclic structural groups are $C_3$-$C_8$ cyclic structural groups, e.g., cyclopropane, cyclobutane, cyclopentane, cyclohexane, cycloheptane, and cyclooctane.

Polytrimethylene Ether Glycol (PO3G)

PO3G, as used herein, is a polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

PO3G is preferably prepared by polycondensation of monomers comprising 1,3-propanediol, thus resulting in polymers or copolymers containing —($CH_2CH_2CH_2O$)— linkage (e.g, trimethylene ether repeating units). As indicated above, at least 50% of the repeating units are trimethylene ether units.

In addition to the trimethylene ether units, other units, such as other polyalkylene ether repeating units, may be present. In the context of this disclosure, the term "polytrimethylene ether glycol" encompasses PO3G made from substantially pure (i.e. at least 99 percent pure) 1,3-propanediol, as well as those polymers (including those described below) containing up to about 50% by weight of comonomers. It is preferred that the PO3G from which the poly(trimethylene ether)glycol (PTMEG) is made is renewably sourced.

PO3G may contain other alkylene ether repeating units in addition to the trimethylene ether units. The monomers for use in preparing polytrimethylene ether glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Comonomer polyols that are suitable for use in the process include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. Preferred comonomer diols are selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, C6-C10 diols (such as 1,6-hexanediol, 1,8-octanediol and 1,10-decanediol) and isosorbide, and mixtures thereof, and C6-C10 diols. Particularly preferred diols are 1,3-propanediol and ethylene glycol.

The 1,3-propanediol employed for preparing the PO3G may be obtained by any of the various well known chemical routes or by biochemical transformation routes. Preferred biochemical routes are described in, for example, U.S. Pat. No. 7,169,588. Trimethylene carbonate (TMC) is prepared by any of the various chemical or biochemical methods known to those skilled in the art. Chemical methods for the preparation of TMC include, but are not limited to: a) reacting 1,3-propanediol with diethylcarbonate in the presence of zinc powder, zinc oxide, tin powder, tin halide or an organotin compound at elevated temperature; b) reacting 1,3-propanediol and phosgene or bis-chloroformates to produce a polycarbonate intermediate that is subsequently depolymerized using heat and, optionally, a catalyst; c) depolymerizing poly(trimethylene carbonate) in a wiped film evaporator under vacuum; d) reacting 1,3-propanediol and urea in the presence of metal oxides; e) dropwise addition of triethylamine to a solution of 1,3-propanediol and ethylchloroformate in THF; and f) reacting 1,3-propanediol and phosgene or diethylcarbonate. Biochemical methods for the preparation of TMC include, but are not limited to, a) lipase catalyzed condensation of diethylcarbonate or dimethylcarbonate with 1,3-propanediol in an organic solvent, and b) lipase-catalyzed depolymerization of poly(trimethylene carbonate) to produce TMC.

Preferably the 1,3-propanediol used as the reactant or as a component of the reactant has a purity of greater than about 99%, and more preferably greater than about 99.9%, by weight as determined by gas chromatographic analysis.

The 1,3-propanediol preferably has the following characteristics:

(1) an ultraviolet absorption at 220 nm of less than about 0.200, and at 250 nm of less than about 0.075, and at 275 nm of less than about 0.075; and/or (2) a CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making PO3G will depend on the desired PO3G, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

Preferred poly(trimethylene-ethylene ether)glycols are prepared by acid catalyzed polycondensation of from 50 to about 99 mole % (preferably from about 60 to about 98 mole %, and more preferably from about 70 to about 98 mole %) 1,3-propanediol and up to 50 to about 1 mole % (preferably from about 40 to about 2 mole %, and more preferably from about 30 to about 2 mole %) ethylene glycol.

The preferred PO3G for use in making the copolymers disclosed herein has an Mn (number average molecular weight) of at least about 250, more preferably at least about 1000, and still more preferably at least about 2000. The Mn is preferably less than about 10000, more preferably less than about 5000, and still more preferably less than about 3500. Blends of PO3Gs can also be used. For example, the PO3G can comprise a blend of a higher and a lower molecular weight PO3G, preferably wherein the higher molecular weight PO3G has a number average molecular weight of from about 1000 to about 5000, and the lower molecular weight PO3G has a number average molecular weight of from about 200 to about 950. The Mn of the blended PO3G will preferably still be in the ranges mentioned above.

PO3G preferred for use herein is typically polydisperse having a polydispersity (i.e. Mw/Mn) of preferably from about 1.0 to about 2.2, more preferably from about 1.2 to about 2.2, and still more preferably from about 1.5 to about 2.1. The polydispersity can be adjusted by using blends of PO3G.

The PO3G preferably has a color value of less than about 100 APHA units (units of the American Public Health Administration), and more preferably less than about 50 APHA.

The compositions produced by the reaction described above find use in a number of finished products. These products include, but are not limited to, biomaterials, engineered polymers, personal care materials, coatings, lubricants and polycarbonate/polyurethanes. When n is less than about 20 in formula 1, the compositions are generally water-clear, viscous liquids that can be used in, for example, coatings and lubricants. When n is about 20 or more, the compositions are generally waxy solids that can be used, for example, in engineered polymers.

The copolymers of the embodiments herein are produced by reacting trimethylene carbonate or a substituted trimethylene carbonate with poly(trimethylene ether)glycol in the presence of an acid (for example, HCl in the presence of diethyl ether) to form the desired copolymer(s).

The process of the present invention employs one or more solvents. Generally, any solvent can be used, as long as it is substantially non-reactive with the reactants and/or catalyst. Examples of solvents useful in the process described herein include dichloromethane, diethyl ether, hexanes and toluene.

The process described herein occurs at ambient temperature, generally between about 20 and 30 degrees Celsius, but can take place as low as the freezing point of the solvent used, or as high as the reflux temperature of the solvent used. The process described herein occurs at atmospheric pressure, but can take place at elevated pressures with adjustment made to the temperature as needed. Once the reactants are added together, they may be mixed by any convenient method. The process can be done in batch, semi-batch or continuous mode, and generally take place in an inert atmosphere (for example, under an inert gas such as nitrogen).

Once the reactants have been contacted with the catalyst in the presence of one or more solvents, the reaction is allowed to continue for the desired time. As shown in the examples below, 100 percent conversion can be achieved by the proper selection of the acid and solvent, and amounts thereof. Additionally, the desired degree of polymerization, n, can be achieved by these selections.

The compositions produced contain carbonate and ether functionalities, in which the carbonate functionality is known to increase the ultraviolet (UV) stability of materials and ether functionality is known to increase the flexibility and low-temperature properties. Additionally, the formed polymers generally have lower viscosities as compared to those of the poly(trimethylene carbonate) diols.

The physical properties such as viscosity of the formed ABA block polymers are dependent, in part, on the number of TMC units within the block. When n is greater than about 20, the ABA block polymer is a waxy solid and at relatively short runs (n is less than about 20) the resulting material is generally a water clear viscous liquid.

As shown in the examples below, the viscosity of the formed ABA block polymers varies with the number of TMC units (n) in the material. By varying n, it is possible to optimize the viscosity to allow for a material having an optimum viscosity for a particular end-use. For example, materials with lower viscosities are desirable for decreasing processing costs as well as for end-use applications (e.g., coatings).

EXAMPLES

A summary of the results obtained in the following examples is in Table 1.

Production of ABA block copolymer from ethylene carbonate and polytrimethylene ether glycol was unsuccessful when the reaction was carried out at room temperature for 18 hours, as shown in the comparative example below.

Unless otherwise stated, all chemicals and reagents were used as received from Aldrich Chemical Co., Milwaukee, Wis.

Poly(1,6-hexanecarbonate) diol oligomer (DESMOPHEN C-200) is commercially available from Bayer.

Cerenol™ H1400 polyol is available from DuPont Co., Wilmington, Del.

Example 1

The 1,3-propanediol homopolymer, Cerenol™ H1400 (2.80 g, 0.002 mol) and trimethylene carbonate (20.40 g, 0.20 mol) and dichloromethane (80.0 g) were placed in an oven dried roundbottomed (RB) flask equipped with a stirring bar and a rubber septum. The reaction was placed under nitrogen and 8.0 mL of a 1M HCl solution in diethyl ether was added all at once via syringe. The resulting solution was stirred at room temperature for 18 hours. A small aliquot was withdrawn and after removal of dichloromethane, the NMR spectra (proton and carbon) showed the reaction to be ~77% complete. The reaction mixture was poured into ~400 mL methanol, then the methanol decanted off and the resulting material washed with an additional 200 mL of methanol. The methanol was decanted off and the polymer dried under vacuum, affording 18.96 g of polymer, Calculated molecular weight (MW): ~10,310, n=~44.

Example 2

The 1,3-propanediol homopolymer, Cerenol™ H1400 (3.03 g, 0.0022 mol) and trimethylene carbonate (20.80 g, 0.204 mol) and dichloromethane (100.0 g) were placed in an oven dried RB flask equipped with a stirring bar and a rubber septum. The reaction was placed under nitrogen and 10.0 mL of a 1M HCl solution in diethyl ether was added all at once via syringe. The resulting solution was stirred at room temperature for 18 hours. A small aliquot was withdrawn and after removal of dichloromethane, the NMR spectra (proton and carbon) showed the reaction to be ~69% complete. The reaction mixture was poured into ~400 mL methanol, then the methanol decanted off and the resulting material washed with an additional 200 mL of methanol. The methanol was decanted off and the polymer dried under vacuum, affording 13.23 g of polymer, Calculated MW: ~10,578, n=~44.

Example 3

The 1,3-propanediol homopolymer, Cerenol™, H1400 (6.03 g, 0.0043 mol) and trimethylene carbonate (20.80 g, 0.204 mol) and dichloromethane (112 g) were placed in an oven dried RB flask equipped with a stirring bar and a rubber septum. The reaction was placed under nitrogen and 10.0 mL of a 1M HCl solution in diethyl ether was added all at once via syringe. The resulting solution was stirred at room temperature for 18 hours. A small aliquot was withdrawn and after removal of dichloromethane NMRs (proton and carbon) showed the reaction to be ~82% complete. The reaction mixture was poured into ~400 mL methanol, then the methanol decanted off and the resulting material washed with an additional 200 mL of methanol. The methanol was decanted off and the polymer dried under vacuum, affording 15.90 g of polymer, Calculated MW: ~7450, n=~30.

Example 4

The 1,3-propanediol homopolymer, Cerenol™, H1400 (20.40 g, 0.0146 mol) and trimethylene carbonate (20.80 g, 0.204 mol) and dichloromethane (50.0 g) were placed in an oven dried RB flask equipped with a stirring bar and a rubber septum. The reaction was placed under nitrogen and 10.0 mL of a 1M HCl solution in diethyl ether was added all at once via syringe. The resulting solution was stirred at room temperature for 22 hours. A small aliquot was withdrawn and after removal of dichloromethane, the NMR spectra (proton and carbon) showed the reaction to be quantitative. Solid sodium carbonate was added (15 g) and the reaction stirred for one hour. The reaction mixture was diluted with dichloromethane (~50 mL) and the sodium carbonate filtered off. The resulting filtrate was concentrated at room temperature and then dried under vacuum. The reaction mixture was poured in methanol (~400 mL) in which the polymer failed to precipitate. This solution was concentrated at reduce pressure and then taken up in dichloromethane, washed with 10% NaOH (2×50 mL) and then with water (2×100 mL), dried over anhydrous sodium sulfate to afford a water clear viscous material of MW (calc.): 2838, n=7.

Example 5

The 1,3-propanediol homopolymer, Cerenol™, H1400 (20.40 g, 0.0146 mol) and trimethylene carbonate (20.40 g, 0.20 mol) and dichloromethane (50.0 g) were placed in an oven dried RB flask equipped with a stirring bar and a rubber septum. The reaction was placed under nitrogen and 10.0 mL of a 1M HCl solution in diethyl ether was added all at once via syringe. The resulting solution was stirred at room temperature for 22 hours. A small aliquot was withdrawn and after removal of dichloromethane, the NMR spectra (proton and carbon) showed the reaction to be quantitative. Solid sodium carbonate was added (15 g) and the reaction stirred for one hour. The reaction mixture was diluted with dichloromethane (~50 mL) and the sodium carbonate filtered off. The resulting filtrate was concentrated at room temperature and then dried under vacuum.

Via NMR, the molecular weight. was calculated to be 2816, n=~7. Viscosity (Brookfield DV11+Pro, Cone and Plate) at 25 degrees Celsius: 6802 cps (59.1% at 0.1 rpm) and at 50 degrees Celsius: 1255 cps (10.9% at 0.1 rpm).

Example 6

The 1,3-propanediol homopolymer, Cerenol™, H1400 (30.00 g, 0.0214 mol) and trimethylene carbonate (20.40 g, 0.20 mol) and dichloromethane (50.0 g) were placed in an oven dried RB flask equipped with a stirring bar and a rubber septum. The reaction was placed under nitrogen and 10.0 mL of a 1M HCl solution in diethyl ether was added all at once via syringe. The resulting solution was stirred at room temperature for 22 hours. A small aliquot was withdrawn and after removal of dichloromethane, the NMR spectra (proton and carbon) showed the reaction to be quantitative. Solid sodium carbonate was added (15 g) and the reaction stirred for one hour. The reaction mixture was diluted with dichloromethane (~50 mL) and the sodium carbonate filtered off. The resulting filtrate was concentrated at room temperature and then dried under vacuum.

Via NMR, the molecular wt. was calculated to be ~2400, n=~7.

TABLE 1

| Example | Cerenol™ H1400 g | TMC (g) | HCl/Ether (1M) mL | Conversion (%) | Calculated MW | Comments |
|---|---|---|---|---|---|---|
| 1 | 2.8 | 20.40 | 8.00 | 77 | 10,310 (~n = 44) | Waxy solid |
| 2 | 3.03 | 20.80 | 8.00 | 69 | 10,578 (~n = 44) | Waxy Solid |
| 3 | 6.02 | 20.80 | 10.00 | 82 | 7,456 (~n = 30) | Waxy Solid |
| 4 | 20.40 | 20.80 | 10.00 | 100 | 2,821 (~n = 7) | Clear liquid |
| 5 | 20.40 | 20.40 | 10.00 | 100 | 2,814 (~n = 7) | Clear liquid |
| 6 | 30.00 | 20.40 | 10.00 | 100 | 2404 (~n = 5) | Clear liquid |

Comparative Example A

The 1,3-propanediol homopolymer, Cerenol™ H1400 (10.00 g, 0.0071 mol) and ethylene carbonate (10.00 g, 0.114 mol) and dichloromethane (25.0 g) were placed in an oven dried RB flask equipped with a stirring bar and a rubber septum. The reaction was placed under nitrogen and 5.0 mL of a 1M HCl solution in diethyl ether was added all at once via syringe. The resulting solution was stirred at room temperature for 18 hours. A small aliquot was withdrawn and after removal of dichloromethane NMRs (proton and carbon) showed no reaction had occurred.

The viscosities of the examples below which were liquid were measured using a TA Instruments AR-G2 controlled-stress rotational rheometer configured with 40 mm parallel plates and a peltier heating system. The viscosities were measured over a shear rate range of 20 to 1000 s−1 and at three temperatures (40, 60 and 80 degrees Celsius). The results are shown in Table 2.

TABLE 2

| Temperature degrees Celsius | Viscosity (cps) | | | | |
|---|---|---|---|---|---|
| | Comp. Ex. A Cerenol™ H1400 | DESMOPHEN C-2001[1] | PTMC-2000[2] | Ex 4[3] | Ex 6[4] |
| 40 | 420 | 5250 | 69500 | 4820 | 4610 |
| 60 | 185 | | 8600 | 1620 | 1590 |
| 80 | 105 | 660[5] | 2500[6] | 710 | 690 |

[1]Poly(1,6-hexanediol carbonate) glycol - Bayer
[2]Poly(1,3-propanediol carbonate) glycol (equivalent wt. ~900)
[3]Calculated Mol. wt. ~2800
[4]Calculated Mol. wt. ~2400
[5]Viscosity at 77 degrees Celsius
[6]Viscosity at 84 degrees Celsius

What is claimed is:

1. A composition, comprising a copolymer comprising unsubstituted or R-substituted polytrimethylene carbonate-based segments and poly(trimethylene ether) glycol -based segments, the copolymer having the structure:

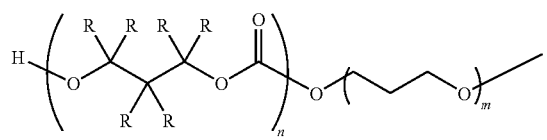

-continued

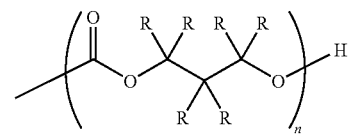

wherein each R substituent is independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and wherein each R substituent can optionally form a cyclic structural group with adjacent R substituents;

m is the number of trimethylene ether units and is an integer of 5 to 100, inclusive; and n is the number of trimethylene carbonate-units, and each n is an integer independently selected from integers of 1 to 50 inclusive.

2. The composition of claim 1, wherein n is 1 to 20.

3. The composition of claim 1, wherein n is greater than 20.

4. The composition of claim 1, wherein m is an integer of 3 to 100 and each n is independently an integer of 1 to 30, inclusive.

5. The composition of claim 1, wherein the copolymer is an ABA block copolymer, wherein A is unsubstituted or R-substituted poly(trimethylene carbonate) and B is poly(trimethylene ether).

6. The composition of claim 1 having a number average molecular weight of 250 to 10,000.

7. The composition of claim 1, wherein one or more segments of the trimethylene carbonate-based segments and the poly(trimethylene ether) glycol -based segments is produced from monomers that are renewably sourced.

8. A process for making a copolymer comprising unsubstituted or R-substituted polytrimethylene carbonate-based segments and poly(trimethylene ether) glycol -based segments, the process comprising:

contacting a poly(trimethylene ether) glycol with trimethylene carbonate or an R-substituted trimethylene carbonate in the presence of an acid to form a polymer having the structure

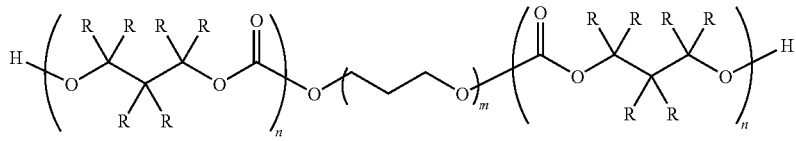

wherein each R substituent is independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and wherein each R substituent can optionally form a cyclic structural group with adjacent R substituents;

m is the number of trimethylene ether units and is an integer of 5 to 100, inclusive; and n is the number of trimethylene carbonate-units, and each n is an integer independently selected from integers of 1 to 50 inclusive.

9. The process of claim 8, wherein the acid is a mineral acid.

10. The process of claim 8, wherein the acid is selected from the group consisting of trifluoroacetic acid, trifluoromethylacetic acid, and trifluoromethanesulfonic acid, and 1,1,2,2-tetrafluoroethanesulfonic acid.

11. The process of claim 8, which is batch, semi-continuous or continuous.

12. The process of claim 8, wherein the formed polymer is an ABA block copolymer wherein A is unsubstituted or R-substituted poly(trimethylene carbonate) and B is poly(trimethylene ether).

13. The process of claim 8, wherein n is less than or equal to 20.

14. The process of claim 8, wherein n is greater than 20.

15. The process of claim 8, wherein the viscosity is from 2000 cps to 5000 cps at 40 degrees Celsius.

16. A thermoplastic elastomer comprising as a soft segment the ABA block copolymer of claim 3.

17. A copolymer made by the process of claim 8.

18. A finished product comprising the composition of claim 2.

19. A finished product comprising the composition of claim 3.

* * * * *